(12) United States Patent
 Mao (10) Patent No.: US 10,950,234 B2
(45) Date of Patent: Mar. 16, 2021

(54) METHOD AND APPARATUS FOR DETERMINING SPEECH INTERACTION SATISFACTION

(71) Applicant: Baidu Online Network Technology (Beijing) Co., Ltd., Beijing (CN)

(72) Inventor: Wandong Mao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 120 days.

(21) Appl. No.: 16/295,915

(22) Filed: Mar. 7, 2019

(65) Prior Publication Data
US 2019/0287524 A1    Sep. 19, 2019

(30) Foreign Application Priority Data

Mar. 15, 2018  (CN) .......................... 201810215597.X (51) Int. Cl.
*G10L 15/22*  (2006.01)
*G10L 15/18*  (2013.01)
(Continued)

(52) U.S. Cl.
CPC .............. *G10L 15/22* (2013.01); *G06F 3/167* (2013.01); *G06F 40/20* (2020.01);
(Continued)

(58) Field of Classification Search
CPC ................................ G10L 15/22; G10L 15/24
See application file for complete search history.

(56) References Cited

U.S. PATENT DOCUMENTS 7,640,164 B2 * 12/2009 Sasaki ..................... G10L 15/22
                                                                                       463/1
2004/0006483 A1 *  1/2004 Sasaki ..................... G10L 15/22
                                                                                     704/277
(Continued)

FOREIGN PATENT DOCUMENTS

CN        105654250 A       6/2016
CN        107220353 A       9/2017
(Continued)

OTHER PUBLICATIONS

Chang Pei et al.; "Research and Analysis of Intelligent Voice Navigation Platform of Telecom Operators"; China Academic Journal Electronic Publishing House; in Chinese, with English abstract only; doi:10.16463/j.cnki.issn1007-3043.2016.09.014; Aug. 18, 2016 (5 pages).

*Primary Examiner* — Daniel Abebe
(74) *Attorney, Agent, or Firm* — Nixon Peabody LLP (57) ABSTRACT

A method and apparatus for determining a speech interaction satisfaction are provided. The method includes: acquiring a speech interaction feature, the speech interaction feature including objective data of speech interaction and subjective data of the speech interaction, and the objective data and the subjective data being data for a given topic; evaluating the objective data to obtain an objective evaluation, and evaluating the subjective data to obtain a subjective evaluation; and obtaining a speech interaction satisfaction outputted by a satisfaction evaluation model by using the objective evaluation and the subjective evaluation as an input of the satisfaction evaluation model. Some embodiments may provide an authentic and comprehensive evaluation of the speech interaction.

15 Claims, 5 Drawing Sheets

(51) Int. Cl.
  *G06F 3/16*   (2006.01)
  *G06F 40/20*  (2020.01)
  *G10L 15/08*  (2006.01)
  *G10L 15/26*  (2006.01)

(52) U.S. Cl.
  CPC .......... *G10L 15/1815* (2013.01); *G10L 15/26* (2013.01); *G10L 2015/088* (2013.01); *G10L 2015/223* (2013.01)

(56) References Cited

U.S. PATENT DOCUMENTS

| | | | |
|---|---|---|---|
| 2019/0139537 A1* | 5/2019 | Akamine | G10L 15/22 |
| 2019/0294638 A1* | 9/2019 | Sugiyama | G06F 16/90332 |
| 2019/0340244 A1* | 11/2019 | Cheung | H04L 51/02 |

FOREIGN PATENT DOCUMENTS

| | | | | |
|---|---|---|---|---|
| CN | 107767881 A | | 3/2018 | |
| JP | 2016192020 | * | 11/2016 | ............. G06F 17/30 |
| JP | 2016192020 A | | 11/2016 | |

* cited by examiner

METHOD AND APPARATUS FOR DETERMINING SPEECH INTERACTION SATISFACTION

CROSS-REFERENCE TO RELATED APPLICATIONS

This application claims priority to Chinese Patent Application no. 201810215597.X, filed in China on Mar. 15, 2018, the contents of which are incorporated herein by reference in their entirety.

TECHNICAL FIELD

Some embodiments of the present disclosure relate to the field of speech interaction, and specifically to a method and apparatus for determining a speech interaction satisfaction.

BACKGROUND

With the development of artificial intelligence technology, the research and development and the use of smart speech interactive product have been paid many attention. Smart speech interaction is an interactive mode based on a voice input. A user may input his request by voice, and the product may respond with corresponding content on the basis of the intent of the request.

In the field of speech interaction, in order to better manufacture and update the smart speech interactive product, it is very important to evaluate a speech interaction satisfaction with the product. Because the evaluation of the speech interaction satisfaction can feed back whether the speech interaction function of the product may be accepted by the user. In the existing technology, the satisfaction evaluation is mainly conducted by using the intent of a single request of the user and the content of a terminal response as the evaluation processing data, calculating an association between the intent and the content using text processing techniques, and annotating the satisfaction or the user with the terminal response.

However, the approach to acquiring the satisfaction of the user only through the association between the content returned by the terminal and the intent of the user cannot acquire the authentic and comprehensive user evaluation of the speech interaction. Thus, it is difficult to evaluate the satisfaction with the speech interaction in the existing evaluation approach.

SUMMARY

Embodiments of the present disclosure provides a method and apparatus for determining a speech interaction satisfaction, which may provide an authentic and comprehensive evaluation of speech interaction.

In a first aspect, some embodiments of the present disclosure provide a method for determining a speech interaction satisfaction. The method includes:

acquiring a speech interaction feature, the speech interaction feature including objective data of speech interaction and subjective data of the speech interaction, and the objective data and the subjective data being data for a given topic;

evaluating the objective data to obtain an objective evaluation, and evaluating the subjective data to obtain a subjective evaluation; and obtaining a speech interaction satisfaction outputted by a satisfaction evaluation model by using the objective evaluation and the subjective evaluation as an input of the satisfaction evaluation model.

In some embodiments, the objective data of the speech interaction includes a user intent, response content, a response delay, and a current playback duration of the response content; and the subjective data of the speech interaction includes: text information corresponding to a voice input of a user after playback of the response content is interrupted.

In some embodiments, the evaluating the objective data to obtain an objective evaluation includes:

acquiring a first objective evaluation based on an intent matching degree between the user intent and the response content;

acquiring a second objective evaluation based on the response delay and a standard delay; and acquiring a third objective evaluation based on the current playback duration of the response content and a standard playback duration of the response content; and the obtaining a speech interaction satisfaction outputted by a satisfaction evaluation model by using the objective evaluation and the subjective evaluation as an input of the satisfaction evaluation model includes:

obtaining the speech interaction satisfaction outputted by the satisfaction evaluation model by using the first objective evaluation, the second objective evaluation, the third objective evaluation, and the subjective evaluation as the input of the satisfaction evaluation model.

In some embodiments, the evaluating the subjective data to obtain a subjective evaluation includes:

performing a semantic analysis on the text information, to obtain a content attribute corresponding to the text information, wherein the content attribute is an emotional attribute or a topic attribute; and obtaining the subjective evaluation based on the content attribute corresponding to the text information.

In some embodiments, if the content attribute is the topic attribute, the obtaining the subjective evaluation based on the content attribute corresponding to the text information includes:

acquiring a topic type corresponding to the text information; and determining the subjective evaluation being less than a preset evaluation value, if the topic type corresponding to the text information is consistent with the topic type corresponding to the user intent.

In some embodiments, if the content attribute is the emotional attribute, the obtaining the subjective evaluation based on the content attribute corresponding to the text information includes:

extracting an emotional keyword in the text information;

acquiring an emotional type according to a corresponding relationship between the emotional keyword and the emotional type, wherein the emotional type includes a positive emotion, a negative emotion, and a neutral emotion; and acquiring the subjective evaluation according to a corresponding relationship between the emotional type and a preset evaluation.

In some embodiments, the acquiring a speech interaction feature includes:

acquiring first log data, wherein an interval between the first log data and second log data in a last period adjacent to the first log data, and the interval between the first log data and third log data in a next period adjacent to the first log data are greater than a preset threshold;

acquiring, in the first log data, topics respectively corresponding to two adjacent voice inputs of the user; and acquiring the speech interaction feature based on the topics respectively corresponding to the two adjacent voice inputs.

In some embodiments, before the obtaining a speech interaction satisfaction outputted by a satisfaction evaluation model by using the objective evaluation and the subjective evaluation as an input of the satisfaction evaluation model, the method further includes:

acquiring a training sample set, wherein the training sample set includes a first sample evaluation, a second sample evaluation, and a satisfaction inputted by the user, the first sample evaluation is obtained by evaluating objective sample data, the second sample evaluation is obtained by evaluating subjective sample data, and the objective sample data and the subjective sample data are data for an identical topic; and obtaining the satisfaction evaluation model by performing iterative training on the basis of the training sample set.

In a second aspect, some embodiments of the present disclosure provide an apparatus for determining a speech interaction satisfaction. The apparatus includes:

an acquisition module, configured to acquire a speech interaction feature, the speech interaction feature including objective data of speech interaction and subjective data of the speech interaction, and the objective data and the subjective data being data for a given topic;

a processing module, configured to evaluate the objective data to obtain an objective evaluation, and evaluate the subjective data to obtain a subjective evaluation; and a determination module, configured to obtain a speech interaction satisfaction outputted by a satisfaction evaluation model by using the objective evaluation and the subjective evaluation as an input of the satisfaction evaluation model.

In some embodiments, the objective data of the speech interaction includes a user intent, response content, a response delay, and a current playback duration of the response content; and the subjective data of the speech interaction includes: text information corresponding to a voice input of a user after playback of the response content is interrupted, or text information inputted by the user after the playback of the response content is completed.

In some embodiments, the processing module is configured to:

acquire a first objective evaluation based on an intent matching degree between the user intent and the response content;

acquire a second objective evaluation based on the response delay and a standard delay; and acquire a third objective evaluation based on the current playback duration of the response content and a standard playback duration of the response content; and the determination module is configured to obtain the speech interaction satisfaction outputted by the satisfaction evaluation model by using the first objective evaluation, the second objective evaluation, the third objective evaluation, and the subjective evaluation as the input of the satisfaction evaluation model.

In some embodiments, the processing module is configured to:

perform a semantic analysis on the text information, to obtain a content attribute corresponding to the text information, wherein the content attribute is an emotional attribute or a topic attribute; and obtain the subjective evaluation based on the content attribute corresponding to the text information.

In some embodiments, if the content attribute is the topic attribute, the processing module is configured to:

acquire a topic type corresponding to the text information; and determine the subjective evaluation being less than a preset evaluation value, if the topic type corresponding to the text information is consistent with the topic type corresponding to the user intent.

In some embodiments, if the content attribute is the emotional attribute, the processing module is configured to:

extract an emotional keyword in the text information;

acquire an emotional type according to a corresponding relationship between the emotional keyword and the emotional type, wherein the emotional type includes a positive emotion, a negative emotion, and a neutral emotion; and acquire the subjective evaluation according to a corresponding relationship between the emotional type and a preset evaluation.

In some embodiments, the acquisition module is configured to:

acquire first log data, wherein an interval between the first log data and second log data in a last period adjacent to the first log data, and the interval between the first log data and third log data in a next period adjacent to the first log data are greater than a preset threshold;

acquire, in the first log data, topics respectively corresponding to two adjacent voice inputs of the user; and acquire the speech interaction feature based on the topics respectively corresponding to the two adjacent voice inputs.

In some embodiments, the apparatus further includes a training module. Before the speech interaction satisfaction outputted by the satisfaction evaluation model is obtained by using the objective evaluation and the subjective evaluation as the input of the satisfaction evaluation model, the training module is configured to:

acquire a training sample set, wherein the training sample set includes a first sample evaluation, a second sample evaluation, and a satisfaction inputted by the user, the first sample evaluation is obtained by evaluating objective sample data, the second sample evaluation is obtained by evaluating subjective sample data, and the objective sample data and the subjective sample data are data for an identical topic; and obtain the satisfaction evaluation model by performing iterative training on the basis of the training sample set.

In a third aspect, some embodiments of the present disclosure provide an apparatus for determining a speech interaction satisfaction. The apparatus includes: at least one processor, and a storage device;

wherein the storage device is configured to store a computer executable instruction, and the computer executable instruction stored by the storage device, when executed by the at least one processor, cause the at least one processor to implement the method for determining a speech interaction satisfaction as described in the first aspect or according to any embodiment in the first aspect.

In a fourth aspect, some embodiments of the present, disclosure provide a non-transitory computer readable storage medium storing a computer executable instruction. The computer executable instruction, when executed by a processor, implements the method for determining a speech interaction satisfaction as described in the first aspect or according to any embodiment in the first aspect.

In the method and apparatus for determining a speech interaction satisfaction provided by some embodiments of the present disclosure, the speech interaction feature is acquired. The speech interaction feature includes the objective data of the speech interaction and the subjective data of the speech interaction. The objective data and the subjective data refer to the data for a given topic. By acquiring the objective data and the subjective data for the given topic, the obtained data for the satisfaction evaluation is authentic and comprehensive, which ensures that the data of the evaluation is authentic and comprehensive, thereby making the satisfaction more comprehensive and close to the authentic user evaluation. The objective evaluation is obtained by evaluating the objective data, and the subjective evaluation is obtained by evaluating the subjective data. The objective evaluation and the subjective evaluation are used as the input of the satisfaction evaluation model, to obtain the speech interaction satisfaction outputted by the satisfaction evaluation model. The satisfaction is acquired by means of the satisfaction evaluation model. Thus, the satisfaction may be quickly and accurately acquired, so that this method may be suitable for the situation where the amount of speech interaction is relatively large.

BRIEF DESCRIPTION OF THE DRAWINGS

In order to more clearly explain the technical solutions in some embodiments of the present disclosure or in the prior art, the accompanying drawings used to describe the embodiments or the prior art will be briefly introduced below. Obviously, the accompanying drawings described below only show some of some embodiments of the present disclosure. To one of ordinary skill in the art, according to the accompanying drawings, other accompanying drawings may be obtained without any inventive effort.

DETAILED DESCRIPTION OF EMBODIMENTS

In order to make objectives, technical solutions, and advantages of the embodiments of the present disclosure more apparent, the technical solutions in some embodiments of the present disclosure will be clearly and completely described below with reference to the accompanying drawings of the present disclosure. Clearly, the described embodiments are some, rather than all of the embodiments of the present disclosure. All other embodiments obtained by one of ordinary skill in the art on the basis of the embodiments in the present disclosure without creative effort are within the scope of protection of the present disclosure.

Figure 1:
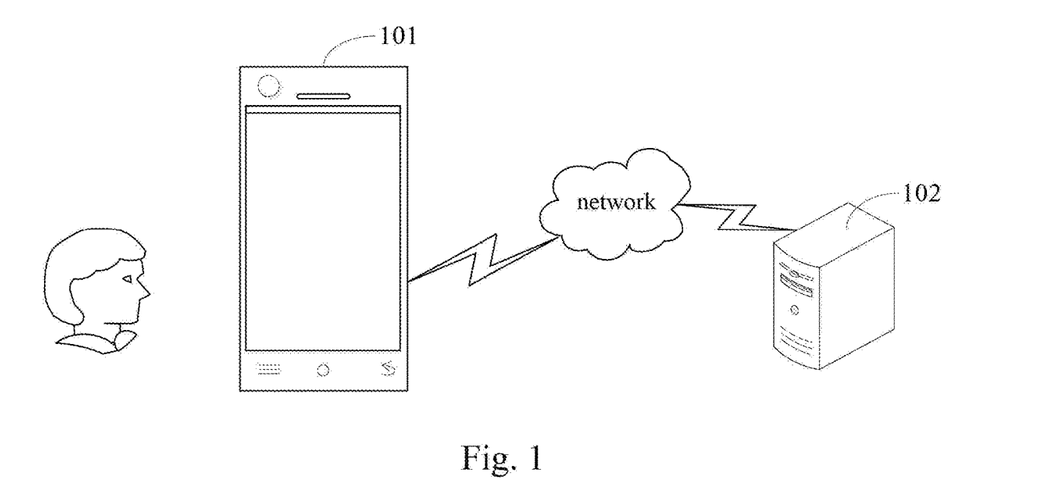
FIG. 1 is a schematic architecture diagram of a system for determining a speech interaction satisfaction provided by some embodiments of the present disclosure.

FIG. 1 is a schematic architecture diagram of a system for determining a speech interaction satisfaction provided by some embodiments of the present disclosure. As shown in FIG. 1, the system provided in this embodiment includes the terminal 101 and the server 102. The terminal 101 may be a story machine for kids, a cell phone, a tablet, a vehicle-mounted terminal, or the like. As long as the terminal 101 can perform a speech interaction with a user, the implementation for the terminal 101 will not be particularly limited in this embodiment.

The speech interaction is based on technologies such as speech recognition, speech synthesis, and natural language understanding. In a plurality of practical application scenarios, the speech interaction provides the smart human-computer interactive experience "can listen, can speak, and understand you" for the terminal. The speech interaction is applicable to a plurality of application scenarios, including smart question and answer, smart playback, and smart search.

The user inputs a query statement into the terminal 101 through speech. The terminal 101 may acquire the intent of the user based on the query statement, acquire the response content corresponding to the intent locally or from the server 102 based on the intent, and feed back the response content to the user, for example, food ordering, ticket booking, or searching for music, a movie, or some kind of goods.

The terminal 101 may provide various speech interaction services for the user. Therefore, for the development and update of the speech interaction of the terminal, it is particularly important to obtain an authentic and comprehensive user evaluation of the speech interaction.

Some embodiments of the present disclosure provide a method for determining a speech interaction satisfaction. The method can provide the authentic and comprehensive evaluation of the speech interaction. The method for determining a speech interaction satisfaction may be performed by the terminal 101 shown in FIG. 1. The terminal 101 may determine the satisfaction based on log data, and then feedback the satisfaction to the server 102. The server 102 performs further processing according to the satisfaction. The method for determining a speech interaction embodiment may also be performed by the server 102 shown in FIG. 2. The terminal 101 sends the log data to the server 102. Then, the server 102 determines the satisfaction and performs the further processing.

In this embodiment, the subject performing the method for determining a speech interaction satisfaction is not particularly limited, and the method may be performed by the terminal 101 or the server 102. In this embodiment, after acquiring the log data, the terminal 101 and the server 102 may determine the speech interaction satisfaction in identical processes.

In this embodiment, in order to quickly determine the satisfaction, the satisfaction is determined with the aid of a satisfaction evaluation model. In this embodiment, the process of how to acquire the satisfaction evaluation model is first described with reference to FIG. 2.

Figure 2:
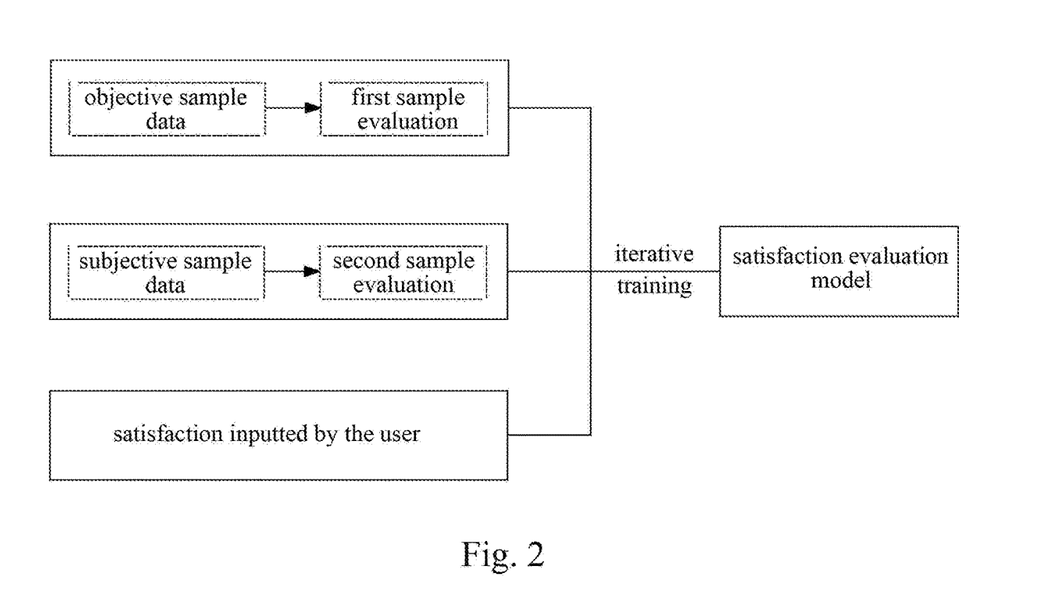
FIG. 2 is a schematic diagram of acquiring a satisfaction evaluation model provided by some embodiments of the present disclosure.

FIG. 2 is a schematic diagram of acquiring the satisfaction evaluation model provided by some embodiments of the present disclosure. In this embodiment, the satisfaction is obtained by evaluating objective data and subjective data. Therefore, when the satisfaction evaluation model is acquired, objective sample data and subjective sample data are simultaneously considered, to acquire the authentic and comprehensive user evaluation of the speech interaction.

The satisfaction evaluation model may be acquired by the terminal, or acquired by the server. Alternatively, after acquiring the satisfaction evaluation model, the server sends the satisfaction evaluation model to the terminal in the form of an installation package.

As shown in FIG. 2, a training sample set is first acquired. The training sample set includes a first sample evaluation, a second sample evaluation, and a satisfaction inputted by the user. It may be understood by one of ordinary skill in the art that the satisfaction evaluation model may be obtained by performing iterative training on an appropriate amount of data in the training sample set (e.g., the first sample evaluation, the second sample evaluation, and the satisfaction inputted by the user).

The first sample evaluation is obtained by evaluating the objective sample data, and the second sample evaluation is obtained by evaluating the subjective sample data. In this embodiment, the objective sample data and the subjective sample data refer to the data for the same topic.

The objective sample data is data that does not include an emotion of the user, for example, data related to the terminal. The subjective sample data is data including the emotion of the user. As long as the data is for the same topic, the data may be acquired and divided into the objective data and the subjective data.

In a specific example, according to the voice input of the user, the user intent "I want to listen to Zhang San's new song" is acquired. According to the intent, the response content returned by the terminal is the audio file of "XX song." When the user wants to give the subjective feedback to the "XX song," the user pauses the play of the audio file, and then inputs "this song is not what I want" by means of voice. At the same time, the user inputs his satisfaction through the terminal. In this process, the playback duration of the "XX song" and the response delay are acquired. Thus, the user performs two rounds of interaction with the terminal for the topic of "song."

In this process, the objective sample data may include: the user intent, the response content, the response delay, and the current playback duration of the response content. The objective evaluation may be obtained by a preset algorithm from the objective sample data. The preset algorithm may be a function including the objective sample data, and is not particularly limited in this embodiment.

The subjective sample data includes: text information corresponding to the voice input of the user after the playback of the response content is interrupted. The subjective evaluation may be obtained by performing a semantic analysis on the text information.

It may be understood by one of ordinary skill in the art that the objective evaluation and the subjective evaluation may refer to a specific evaluation value, and the satisfaction inputted by the user also refers to a specific value. The satisfaction evaluation model may be obtained by performing iterative training on the values.

Alternatively, for different objective sample data, the evaluation may also be respectively performed, to obtain respective corresponding evaluation values of the data. For example, the evaluation value $x1$ may be obtained based on the user intent and the response content. The evaluation value $y1$ may be obtained based on the response delay. The evaluation value $z1$ may be obtained based on the current playback duration of the response content. The evaluation value corresponding to the subjective evaluation is $p1$, and the satisfaction inputted by the user is $n1$.

In this embodiment, a possible satisfaction evaluation model is provided. The satisfaction evaluation model may be $Ax+By+Cz+Dp=n$. The above evaluation values are substituted into the satisfaction evaluation model, and thus the coefficients A, B, C, and D may be obtained by performing the iterative training. Accordingly, the satisfaction evaluation model may be obtained. After being obtained, the evaluation values are directly substituted into the model, and thus the final satisfaction n may be obtained. In this embodiment, a model is shown as an example to describe how to construct the satisfaction evaluation model. For other forms of models, the model which can provide a satisfaction with the subjective evaluation and the objective evaluation is within the scope of protection of this embodiment. The specific implementation for the satisfaction evaluation model is not particularly limited in this embodiment.

The following detailed embodiments are used to describe how to acquire the satisfaction through the satisfaction evaluation model in some embodiments of the present disclosure.

Figure 3:
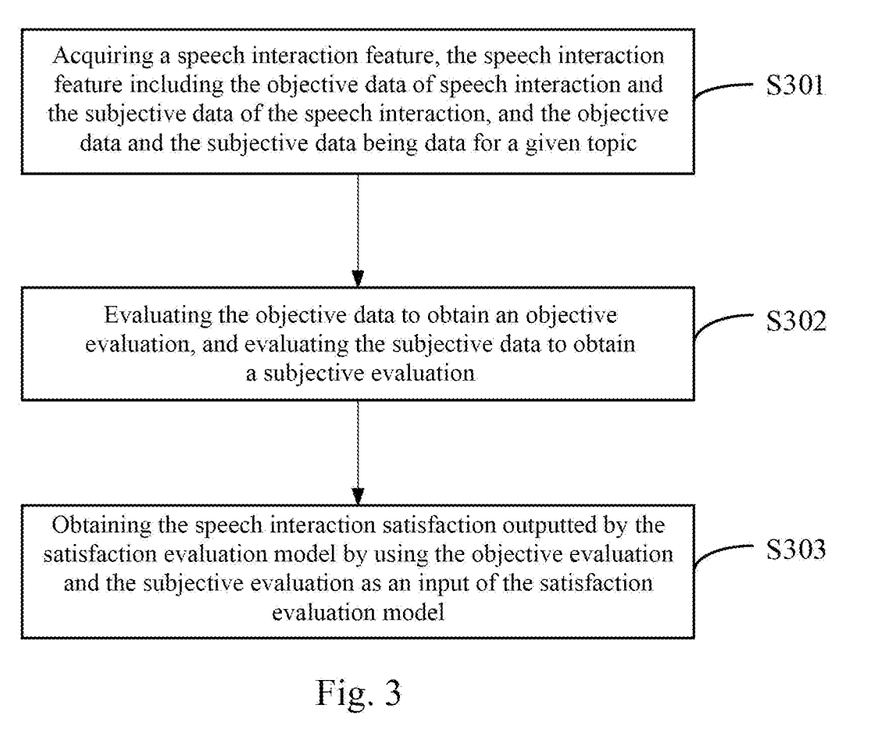
FIG. 3 is the first flowchart of a method for determining a speech interaction satisfaction provided by some embodiments of the present disclosure.

FIG. 3 is the first flowchart of the method for determining a speech interaction satisfaction provided by some embodiments of the present disclosure. The subject performing the method may be the terminal or the server shown in FIG. 1. As shown in FIG. 3, the method includes the following steps.

S301, acquiring a speech interaction feature, the speech interaction feature including the objective data of speech interaction and the subjective data of the speech interaction, and the objective data and the subjective data being data for a given topic.

In this embodiment, the speech interaction feature may be acquired from the log data of the terminal. In a specific implementation process, after acquiring the voice inputted by the user, the terminal converts the voice into text information, acquires the user intent based on the text information, acquires the response content based on the user intent, and feeds back the response content to the user. The user may provide a subjective feedback based on the response content.

For the interaction data between the user and the terminal, the topic corresponding to each piece of data may be acquired. Then, the subjective data and the objective data for the given topic are acquired. Specifically, the subjective data and objective data for the given topic may be acquired by performing a semantic analysis, a content analysis, and an analysis of a time sequence on the interaction data. Here, the data is generated in time sequence. In this embodiment, the approach to acquiring the data for the given topic is not particularly limited.

Alternatively, in a specific example, the input time and the text information of the voice, the identifier and attribute of the response content, and the response time will form the log data. It may be understood by one of ordinary skill in the art that, in the log data, the time is recorded for each log, and first log data is acquired according to the time information. The first log data refers to a piece of log data that the user continuously interacts with the terminal.

In a specific implementation process, the interval between the times of the recorded logs is acquired. When the interval between two times is greater than a preset threshold, the log data between the two times is acquired as the first log data. The first log data refers to all data on the interval between the two times.

Figure 4:
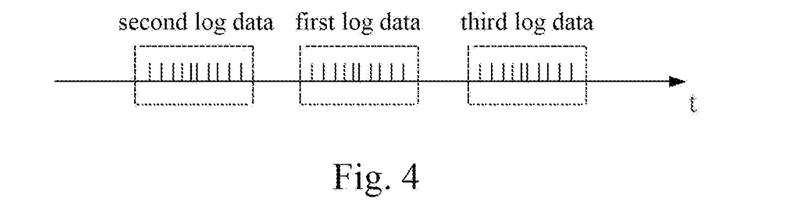
FIG. 4 is a schematic diagram of log data provided by some embodiments of the present disclosure.

It may be understood by one of ordinary skill in the art that the interval between the first log data and the second log data in a last period adjacent to the first log data, and the interval between the first log data and the third log data in a next period adjacent to the first log data are greater than a preset threshold. The second log data and the third log data may be a piece of log data, or may be all data on the interval between the two times as similar to the first log data. FIG. 4 is a schematic diagram of log data provided by some embodiments of the present disclosure. As shown in FIG. 4, on the time axis, the middle section is the recording time of each piece or data in the first log data. It may be understood by one of ordinary skill in the art that the first log data, the second log data, and the third log data correspond to the data divided by the session.

After the first log data is obtained, in the first log data, the speech interaction feature is acquired based on the text information corresponding to two adjacent voice inputs of the user.

It may be understood by one of ordinary skill the art that when the speech interaction is performed, the process of the speech interaction between the user and the terminal is voice input-response content-semantic input-response content . . . . In this way, the voice input alternates with the response content.

After the voice input is converted into the text information, the semantic analysis may be performed on the text information, and the text information may be the user intent or the user feedback. In this embodiment, when the two adjacent pieces of text information are respectively the user intent and the user feedback, the speech interaction feature is obtained by extracting the related information of the user intent, the user feedback, and the response content fed back by the terminal. That is, the feature information is extracted in the process of voice input-response content-semantic input. That is, the process is user intent-response content-user feedback. When the user feedback does not involve the content of other topics, it is considered that the user feedback as for the topic corresponding to the user intent, that is, the topic is unchanged. The subjective data is the user feedback, and the objective data includes the related information of the user intent and the response content.

It may be understood by one of ordinary skill in the art that if a continuous voice input involves two different topics at the same time, the voice input may be divided into two parts. For example, when the former part involves one topic and the latter part involves another topic, the former part may be put under a former topic to extract the speech interaction feature, and the latter part may be out under a latter topic to extract the speech interaction feature.

S302, evaluating the objective data to obtain an objective evaluation, and evaluating the subjective data to obtain a subjective evaluation.

It may be understood by one of ordinary skill in the art that the objective data and the subjective data are data having different forms, different formats, or different types. In order to normalize the data as the input of the satisfaction evaluation model, the objective data may be evaluated to obtain the objective evaluation, and the subjective data may be evaluated to obtain the subjective evaluation.

Both the objective evaluation and subjective evaluation are evaluation values. The evaluation values may be calculated according to the total score value of the satisfaction, or the evaluation values may be determined for different data types. Alternatively, the evaluation values may range from −1 to 1.

It may be understood by one of ordinary skill in the art that the approach to evaluating the objective data and the approach to evaluating the subjective data are identical to the evaluation approach to establishing the satisfaction evaluation model, thereby ensuring the reasonability of the evaluation values and the satisfaction evaluation model.

S303, obtaining the speech interaction satisfaction outputted by the satisfaction evaluation model by using the objective evaluation and the subjective evaluation as an input of the satisfaction evaluation model.

After the objective evaluation and the subjective evaluation are obtained, the objective evaluation and the subjective evaluation are used as the input of the satisfaction evaluation model. After the inputs are calculated and analyzed through the satisfaction evaluation model, the output of the satisfaction evaluation model is the speech interaction satisfaction.

In the method for determining a speech interaction satisfaction provided by some embodiments of the present disclosure, the speech interaction feature is acquired. The speech interaction feature includes the objective data of the speech interaction and the subjective data of the speech interaction. The objective data and the subjective data refer to the data for a given topic. By acquiring the objective data and the subjective data for the given topic, the data for the satisfaction evaluation may be acquired authentically and comprehensively, which ensures that the data of the evaluation is authentic and comprehensive, thereby making the satisfaction more comprehensive and close to the authentic user evaluation. The objective evaluation is obtained by evaluating the objective data, and the subjective evaluation is obtained by evaluating the subjective data. The objective evaluation and the subjective evaluation are used as the input of the satisfaction evaluation model, to obtain the speech interaction satisfaction outputted by the satisfaction evaluation model. The satisfaction is acquired by means of the satisfaction evaluation model. Thus, the satisfaction may be quickly and accurately acquired, so that this method may be suitable for the situation where the amount of speech interaction is relatively large.

The approach to acquiring the objective evaluation and the subjective evaluation is described in detail below using the specific implementations. In this embodiment, the objective data of the speech interaction includes: the user intent, the response content, the response delay, and the current playback duration of the response content. The subjective data of the speech interaction includes: the text information corresponding to the voice input of the user after the playback of the response content is interrupted.

The higher the intent matching degree between the user intent and the response content is, the shorter the response delay is. The longer the current playback duration of the response content is, the higher the satisfaction of the user is, and the larger the value of the objective evaluation is.

The emotional information of the text information is acquired. The better the emotion of the user is, the larger the value of the subjective evaluation is.

The details will be described below with reference to FIGS. 5 and 6. The approach to acquiring the objective evaluation and the subjective evaluation described below is applicable to the embodiment of establishing the model shown in FIG. 2, and also applicable to the embodiment of determining the satisfaction shown in FIG. 3.

Figure 5:
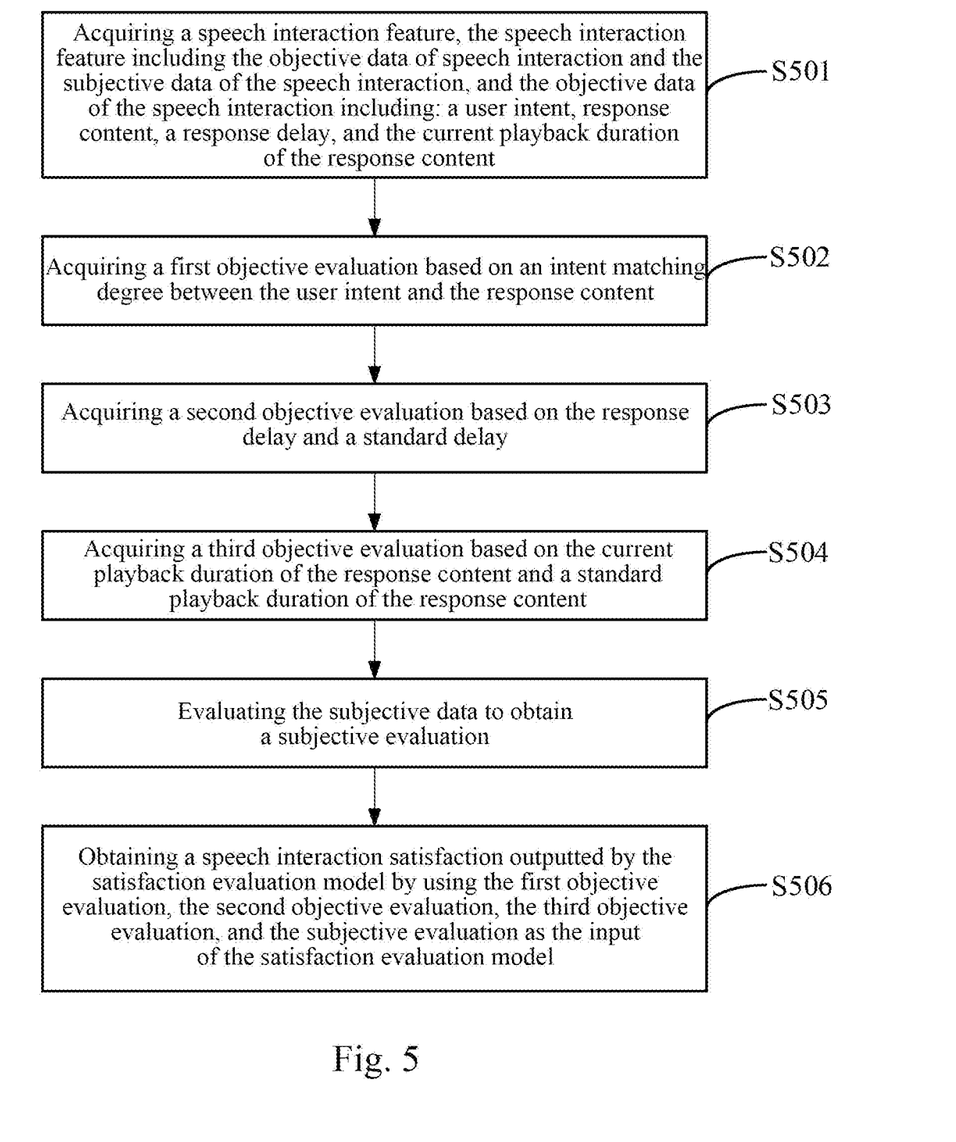
FIG. 5 is the second flowchart of the method for determining a speech interaction satisfaction provided by some embodiments or the present disclosure.

FIG. 5 is the second flowchart of the method for determining a speech interaction satisfaction provided by some embodiments of the present disclosure. As shown in FIG. 5, the method includes the following steps.

S501, acquiring a speech interaction feature, the speech interaction feature including the objective data of speech interaction and the subjective data of the speech interaction, and the objective data of the speech interaction including: a user intent, response content, a response delay, and the current playback duration of the response content.

Specifically, the approach to acquiring the speech interaction feature in S501 is similar to the approach to acquiring the speech interaction feature in S101. The objective data in this embodiment includes: the user intent, the response content, the response delay, and the current playback duration of the response content.

The objective data includes the user intent and various feedbacks of the terminal for the user intent. The intent refers to the operation on field data, and is generally named after a verb-object phrase (e.g., inquire the weather, and search for the music). The feedback of the terminal for the user intent includes the response content, the response delay, and the current playback duration of the response content.

S502, acquiring a first objective evaluation based on an intent matching degree between the user intent and the response content.

A semantic analysis is performed on the user intent to acquire the content in the user intent such as a field attribute, and the content in the response content such as the field attribute is extracted. The intent matching degree is determined based on the similarity between the field attributes. The value of the intent matching degree may range from 0% to 100%, and the intent matching degree may be converted into the first objective evaluation. Correspondingly, the value of the first objective evaluation ranges from 0 to 1. For example, the user intent is Zhang San's A song, and the response content is Zhang San's B song. If the field attribute refers to the singer name and the song name, the similarity is 50%, and the corresponding first objective evaluation is 0.5.

S503, acquiring a second objective evaluation based on the response delay and a standard delay.

The standard delay may be a predetermined delay acceptable by the user. For example, the standard delay is 200 ms, and the second objective evaluation corresponding to the standard delay is 0. When the response delay is greater than the standard delay, the second objective evaluation is less than 0. When the response delay is less than the standard delay, the second objective evaluation is greater than 0.

In some implementations, a normalization process may be performed according to the standard delay, such that the second objective evaluation ranges from −1 to 1. For example, when the response delay is greater than the standard delay, if the difference between the response delay and the standard delay is greater than the standard delay, the value of the second objective evaluation is 1. When the difference between the response delay and the standard delay is less than the standard delay, the second objective evaluation is obtained by taking the additive inverse of the ratio of the difference to the standard delay. When the response delay is less than the standard delay, the difference between the standard delay and the response delay is acquired, and the ratio of the difference to the standard delay is used as the second objective evaluation.

S504, acquiring a third objective evaluation based on the current playback duration of the response content and a standard playback duration of the response content.

In this embodiment, the longer the current playback duration of the response content is, the higher the satisfaction of the user is. The ratio of the current playback duration to the standard playback duration may be used as the third objective evaluation.

S505, evaluating the subjective data to obtain a subjective evaluation.

S506, obtaining a speech interaction satisfaction outputted by the satisfaction evaluation model by using the first objective evaluation, the second objective evaluation, the third objective evaluation, and the subjective evaluation as the input of the satisfaction evaluation model.

The first objective evaluation, the second objective evaluation, the third objective evaluation, and the subjective evaluation are used as the input of the satisfaction evaluation model. By the processing through the satisfaction evaluation model, the satisfaction evaluation model will directly output the speech interaction satisfaction.

It may be understood by one of ordinary skill in the art that, when the satisfaction evaluation model is established, the input of the model is the first objective evaluation, the second objective evaluation, the third objective evaluation, and the subjective evaluation which correspond to the sample data, and the satisfaction inputted by the user. Then, the satisfaction evaluation model is obtained by performing the iterative training.

In the embodiment of the present disclosure, the objective evaluations are respectively acquired according to the user intent, the response content, the response delay, and the current playback duration of the response content. Thus, the satisfaction of the user is acquired based on the objective evaluations that combine various objective factors such as the content, the delay, and the playback duration, which makes the satisfaction accurate and comprehensive.

Figure 6:
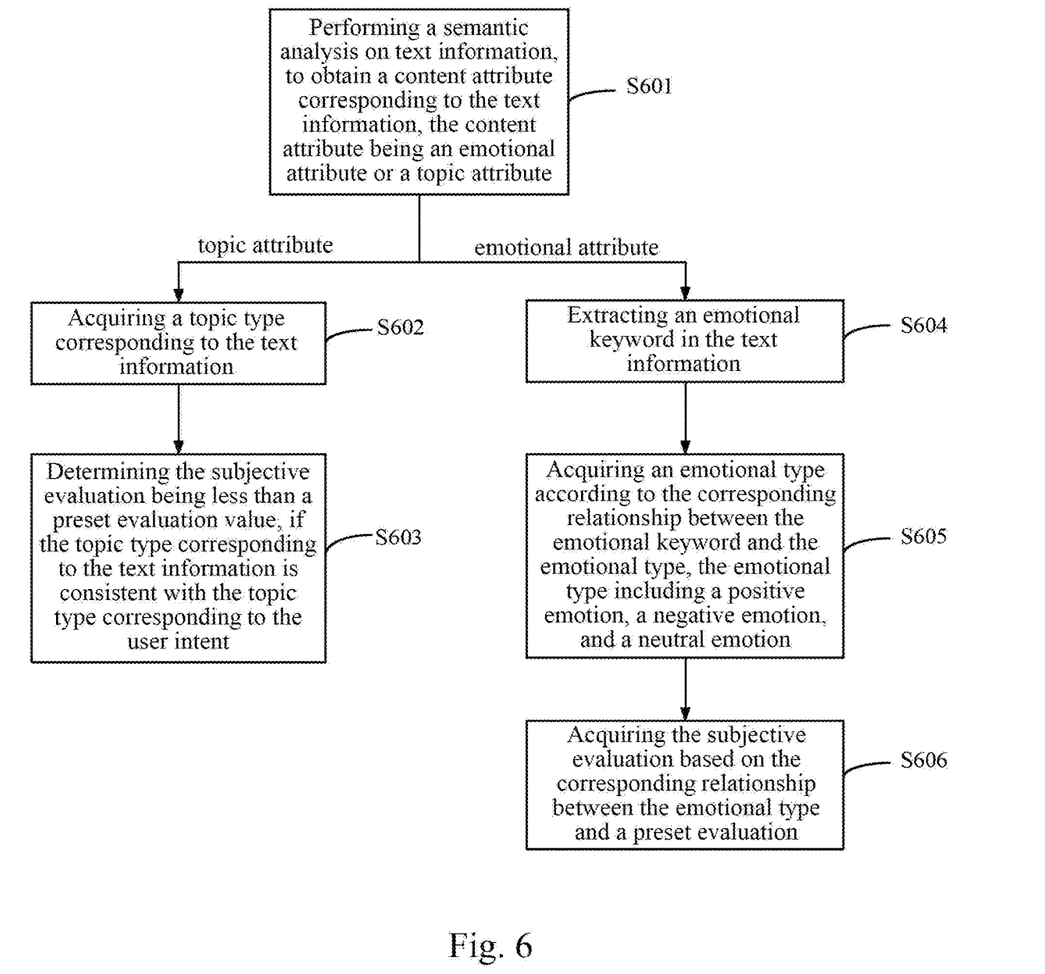
FIG. 6 is a flowchart of acquiring a subjective evaluation provided by some embodiments of the present disclosure.

FIG. 6 is a flowchart of acquiring a subjective evaluation provided by some embodiments of the present disclosure. The objective evaluation provided in this embodiment may be applied to any of the above embodiments. The subjective data of the speech interaction corresponding to the objective evaluation includes: the text information corresponding to the voice input of a user after the playback of response content is interrupted, or the text information inputted by the user after the playback of the response content is completed (i.e., the feedback of the user to the response content). The feedback may be a direct feedback or an emotional feedback. As shown in FIG. 6, the method includes the following steps.

S601, performing a semantic analysis on text information, to obtain a content attribute corresponding to the text information, the content attribute being an emotional attribute or a topic attribute.

After the text information corresponding to the voice feedback inputted by the user on the response content, the semantic analysis is performed on the text information to obtain the content attribute corresponding to the text information. In this embodiment, the content attribute is divided into the emotional attribute and the topic attribute. The emotional attribute refers to the content in which the user expresses an emotion, and the topic attribute refers to the further operation of the user on the current topic.

In a specific implementation process, a keyword in the text information may be extracted by performing the semantic analysis. The keyword is matched with a word in an emotional library or a topic library, to determine the content attribute corresponding to the text information.

S602, acquiring a topic type corresponding to the text information.

S603, determining the subjective evaluation being less than a preset evaluation value, if the topic type corresponding to the text information is consistent with the topic type corresponding to the user intent.

S602-S603 are set for the situation that the content attribute of the text information is the topic attribute. When the topic type corresponding to the text information is consistent with the topic type corresponding to the user intent, it is illustrated that the user is not satisfied with the response content fed back according to the current topic, and repeatedly inputs the content. Therefore, the subjective evaluation is less than the preset evaluation value. The specific evaluation value may be determined based on the number of repeated inputs of the user and the length of the inputted text.

S604, extracting an emotional keyword in the text information.

S605, acquiring an emotional type according to the corresponding relationship between the emotional keyword and the emotional type, the emotional type including a positive emotion, a negative emotion, and a neutral emotion.

S606, acquiring the subjective evaluation based on the corresponding relationship between the emotional type and a preset evaluation.

S604-S606 are set for the situation that the content attribute is the emotional attribute. The emotional keyword in the text information may be extracted. In this embodiment, an emotional database may be preset, and the emotional database includes a positive emotional data sub-library, a negative emotional data sub-library, and a neutral emotional data sub-library.

The emotional keyword is matched with the words in the emotional database. If the emotional keyword matches the positive emotional data sub-library, the emotional type is the positive emotion, and the value of the corresponding subjective evaluation is 1. If the emotional keyword matches the negative emotional data sub-library, the emotional type is the negative emotion, and the value of the corresponding subjective evaluation is −1. If the emotional keyword matches the neutral emotional data sub-library, the emotional type is the neutral emotion, and the value of the corresponding subjective evaluation is 0.

In some embodiments of the present disclosure, the subjective satisfaction of the user for the speech interaction may be obtained by analyzing the subjective feedback of the user. In some embodiments of the present disclosure, when the subjective evaluation is determined, the evaluations may be provided for various operations of the user by analyzing the emotion of the user and the repeated indications of the user for the given topic, which will not neglect various expressions of the user, and thus the satisfaction of the user can be truly fed back.

In the foregoing embodiments, some embodiments of the present disclosure show a process of determining a satisfaction with the session of a topic. In the specific implementation process, the satisfactions of the sessions of a plurality of topics may be continuously acquired. For the method for determining a satisfaction with the session of each topic, reference may be made to the above embodiments. Some embodiments are provide below to illustrate how to acquire satisfactions with the sessions of the plurality of topics.

A specific example is: user intent 1-response content 1-user intent 2-response content 2-subjective feedback+user intent 3-response content 3 . . . . It may be seen from the above that, for the user intent 1 and the response content 1, the user does not perform a user feedback, and thus only the objective evaluation can be acquired. For the implementation of the objective evaluation, reference may be made to the above embodiments. The satisfaction evaluation model may only involve the objective evaluation, or may involve both the objective evaluation and the subjective evaluation by setting the input of the subjective evaluation as 0. For user intent 2-response content 2-subjective feedback, the satisfaction may be determined using the above satisfaction determining method. For user intent 3-response content 3, the satisfaction may be determined based on the specific implementation situation.

After a plurality of satisfactions are obtained, the terminal or the server performs various analyses on the data of the plurality of satisfactions, to obtain the product performance of the terminal.

It may be understood by one of ordinary skill in the art that approach to taking the evaluation value corresponding to the above each subjective evaluation or objective evaluation is only illustrative. Other value taking approaches may also be used. For example, for the 5-point scale, the 10-point scale, and the 100-point scale, the value taking approaches are different. The value taking approach is not limited in this embodiment.

Figure 7:
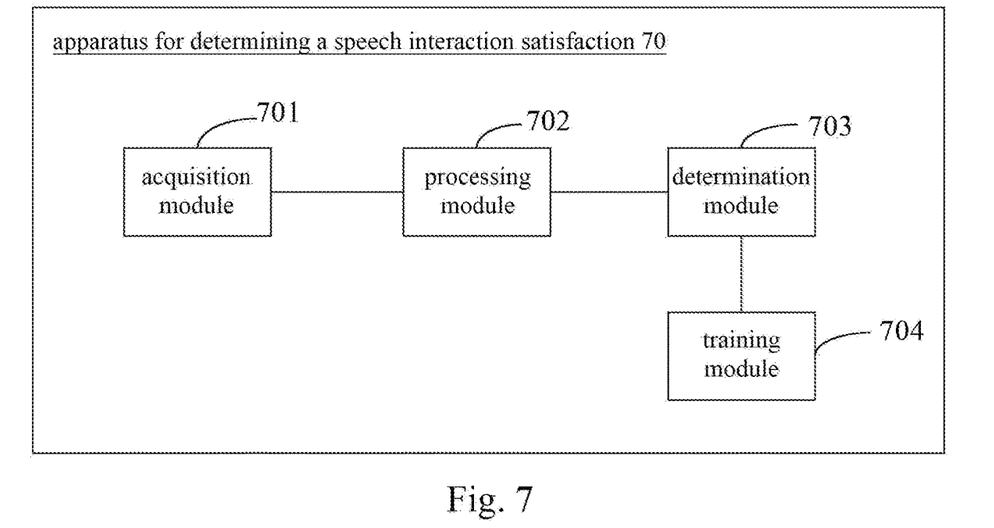
FIG. 7 is a schematic structural diagram of an apparatus for determining a speech interaction satisfaction provided by some embodiments of the present disclosure.

FIG. 7 is a schematic structural diagram of an apparatus for determining a speech interaction satisfaction provided by some embodiments of the present disclosure. As shown in FIG. 7, the apparatus 70 includes: an acquisition module 701, a processing module 702, and a determination module 703. Alternatively, the apparatus further includes a training module 704.

The acquisition module 701 is configured to acquire a speech interaction feature. The speech interaction feature includes objective data of speech interaction and subjective data of the speech interaction, and the objective data and the subjective data are data for a given topic.

The processing module 702 is configured to evaluate the objective data to obtain an objective evaluation, and evaluate the subjective data to obtain a subjective evaluation.

The determination module 703 is configured to obtain a speech interaction satisfaction outputted by a satisfaction evaluation model by using the objective evaluation and the subjective evaluation as an input of the satisfaction evaluation model.

Alternatively, the objective data of the speech interaction includes: a user intent, response content, a response delay, and a current playback duration of the response content.

The subjective data of the speech interaction includes: text information corresponding to a voice input of a user after playback of the response content is interrupted, or text information inputted by the user after the playback of the response content is completed.

Alternatively, the processing module 702 is configured to:
acquire a first objective evaluation based on an intent matching degree between the user intent and the response content;
acquire a second objective evaluation based on the response delay and a standard delay; and
acquire a third objective evaluation based on the current payback duration of the response content and a standard playback duration of the response content.

The determination module 703 is configured to: obtain the speech interaction satisfaction outputted by the satisfaction evaluation model by using the first objective evaluation, the second objective evaluation, the third objective evaluation, and the subjective evaluation as the input of the satisfaction evaluation model.

Alternatively, the processing module 702 is configured to:
perform a semantic analysis on the text information, to obtain a content attribute corresponding to the text information, wherein the content attribute is an emotional attribute or a topic attribute; and
obtain the subjective evaluation based on the content attribute corresponding to the text information.

Alternatively, if the content attribute is the topic attribute, the processing module 702 is configured to:
acquire a topic type corresponding to the text information; and determine the subjective evaluation being less than a preset evaluation value, if the topic type corresponding to the text information is consistent with the topic type corresponding to the user intent.

Alternatively, if the content attribute is the emotional attribute, the processing module 702 is configured to:

extract an emotional keyword in the text information;

acquire an emotional type according to a corresponding relationship between the emotional keyword and the emotional type, wherein the emotional type includes a positive emotion, a negative emotion, and a neutral emotion; and acquire the subjective evaluation according to a corresponding relationship between the emotional type and a preset evaluation.

Alternatively, the acquisition module 701 is configured to:

acquire first log data, wherein an interval between the first log data and second log data in a last period adjacent to the first log data, and the interval between the first log data and third log data in a next period adjacent to the first log data are greater than a preset threshold;

acquire, in the first log data, topics respectively corresponding to two adjacent voice inputs of the user; and acquire the speech interaction feature based on the topics respectively corresponding to the two adjacent voice inputs.

Alternatively, before the speech interaction satisfaction outputted by the satisfaction evaluation model is obtained by using the objective evaluation and the subjective evaluation as the input of the satisfaction evaluation model, the training module 704 is configured to:

acquire a training sample set, wherein the training sample set includes a first sample evaluation, a second sample evaluation, and a satisfaction inputted by the user, the first sample evaluation is obtained by evaluating objective sample data, the second sample evaluation is obtained by evaluating subjective sample data, and the objective sample data and the subjective sample data are data for an identical topic; and obtain the satisfaction evaluation model by performing iterative training on the basis of the training sample set.

The apparatus for determining a speech interaction satisfaction provided in this embodiment may be used to perform the embodiments of the method. The implementations and the technical effects of the apparatus are similar to that of the method, which will not be repeatedly described in this embodiment.

Figure 8:
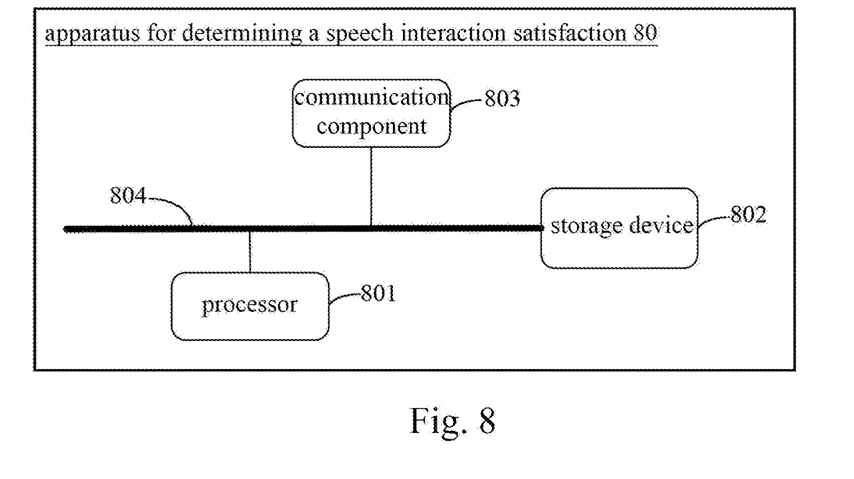
FIG. 8 is a hardware structural diagram of an apparatus for determining a speech interaction satisfaction provided by some embodiments of the present disclosure.

FIG. 8 is a hardware structural diagram of an apparatus for determining a speech interaction satisfaction according to some embodiments of the present disclosure. As shown in FIG. 8, the apparatus 80 for determining a speech interaction satisfaction includes:

at least one processor 801, and a storage device 802.

The storage device 802 is configured to store a computer executable instruction.

The computer executable instruction stored by the storage device 802, when executed by the at least one processor 801, cause the at least one processor 801 to implement the method for determining a speech interaction satisfaction as described above.

For the specific implementation process for the processor 801, reference may be made to the embodiments of the method. The implementation principle and the technical effects of the processor 801 are similar to that of the method, which will not be repeatedly described in this embodiment.

The determining apparatus 80 further includes a communication component 803. The processor 801, the storage device 802, and the communication component 803 are connected via a bus 804.

In the embodiments of FIGS. 7 and 8, the apparatus for determining a speech interaction satisfaction may be the terminal or the server shown in FIG. 1.

Some embodiments of the present disclosure further provide a non-transitory computer readable storage medium storing computer executable instructions. The computer executable instructions, when executed by a processor, implement the method for determining a speech interaction satisfaction as described above.

In the above embodiments, it should be understood that the disclosed apparatus and method may be implemented in other ways. For example, the embodiments of the apparatus described above are only illustrative. For example, the division of the modules is only a logical function division. In an actual implementation, the modules may be divided in another way. For example, a plurality of modules may be combined or integrated into another system, or some features may be ignored or not executed. In addition, the mutual coupling or direct coupling or communication shown or discussed may be realized by the indirect coupling or communication through some interfaces, apparatuses, and modules, and may be in an electrical, mechanical or other form.

The modules described as separate components may be or may not be physically separated, and the components displayed as modules may be or may not be physical units, and may be located together, or may be distributed on a plurality of network units. Some or all of the modules may be selected according to actual needs, to achieve the objective of the solution of the embodiments.

In addition, each functional module in each embodiment of the present disclosure may be integrated into one processing unit, each module may be separately and physically present, or two or more modules may be integrated into one unit. The unit, formed by the above modules may be implemented in the form of hardware or in the form of a unit combining the functions of hardware and software.

The integrated module implemented in the form of a software functional module may be stored in the computer readable storage medium. The software functional module is stored in a storage medium, and includes several instructions used to cause a computer device (which may be a personal computer, a server, or a network device) or a processor to perform some of the steps of the method described in some embodiments of the present disclosure.

It should be understood that the foregoing processor may be a central processing unit (abbreviated as CPU), or may be other general-purpose processor, digital signal processors (abbreviated as DSP), and application specific integrated circuit (abbreviated as ASIC). The general-purpose processor may be a microprocessor, or the processor may be any conventional processor. The steps of the method disclosed in combination with the invention may be directly embodied as the completion of the execution of the hardware processor or the completion of the execution of the combination of hardware and software modules in the processor.

The storage device may include a high speed RAM, and may also include a non-transitory memory (NVM), for example, at least one magnetic-disk memory. The storage device may also be a USE disk, a removable hard disk, a read-only memory, a magnetic disk, or an optical disk.

The bus may be an industry standard architecture (ISA) bus, a peripheral component interconnect (PCI) bus, an extended industry standard architecture (EISA) bus, or the like. The bus may be divided into an address bus, a data bus, a control bus, and the like. For ease of description, the bus in the accompanying drawings of the present disclosure is not limited to only one bus or one type of bus.

The above storage medium may be implemented by any type of transitory or non-transitory storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk. The storage medium may be any available medium that can be accessed by a general-purpose or special-purpose computer.

An exemplary storage medium is coupled to the processor, so that the processor can read information from the storage medium, and may write information into the storage medium. Obviously, the storage medium may also be a constituent part of the processor. The processor and the storage medium may be located in an application specific integrated circuit (abbreviated as ASIC). Obviously, the processor and the storage medium may also be used as a discrete assembly in the terminal or server.

It may be understood by one of ordinary skill in the art that all or some of the steps of implementing the above method embodiments may be performed by the hardware related to a program instruction. The above program may be stored in a computer readable storage medium. The program, when executed, performs the steps including the foregoing method embodiments. The above storage medium includes: various media that may store a program code, for example, a ROM, a RAM, a magnetic disk, or an optical disk.

Finally, it should be noted that the above embodiments are merely used to describe the technical solution of the present disclosure, rather than limit the technical solution. Although the present disclosure is described in detail with reference to the foregoing embodiments, it should be understood by one of ordinary skill in the art that the technical solutions described in the foregoing embodiments may be modified, or some or all of the technical features may be equivalently substituted by one of ordinary skill in the art. According to the modifications or substitutions, the nature of the corresponding technical solution will not deviate from the scope of the technical solution of each embodiment of the present disclosure.

What is claimed is:

1. A method for determining a speech interaction satisfaction, comprising:
   acquiring a speech interaction feature, the speech interaction feature including objective data of speech interaction and subjective data of the speech interaction, and the objective data and the subjective data being data for a given topic, wherein the objective data of the speech interaction includes a user intent, response content, a response delay, and a current playback duration of the response content; and the subjective data of the speech interaction includes: text information corresponding to a voice input of a user after playback of the response content is interrupted, or text information inputted by the user after the playback of the response content is completed;
   evaluating the objective data to obtain an objective evaluation, and evaluating the subjective data to obtain a subjective evaluation; and
   obtaining a speech interaction satisfaction outputted by a satisfaction evaluation model by using the objective evaluation and the subjective evaluation as an input of the satisfaction evaluation model.

2. The method according to claim 1, wherein the evaluating the objective data to obtain an objective evaluation comprises:
   acquiring a first objective evaluation based on an intent matching degree between the user intent and the response content;
   acquiring a second objective evaluation based on the response delay and a standard delay; and
   acquiring a third objective evaluation based on the current playback duration of the response content and a standard playback duration of the response content; and
   the obtaining a speech interaction satisfaction outputted by a satisfaction evaluation model by using the objective evaluation and the subjective evaluation as an input of the satisfaction evaluation model comprises:
   obtaining the speech interaction satisfaction outputted by the satisfaction evaluation model by using the first objective evaluation, the second objective evaluation, the third objective evaluation, and the subjective evaluation as the input of the satisfaction evaluation model.

3. The method according to claim 1, wherein the evaluating the subjective data to obtain a subjective evaluation comprises:
   performing a semantic analysis on the text information, to obtain a content attribute corresponding to the text information, wherein the content attribute is an emotional attribute or a topic attribute; and
   obtaining the subjective evaluation based on the content attribute corresponding to the text information.

4. The method according to claim 3, wherein, if the content attribute is the topic attribute, the obtaining the subjective evaluation based on the content attribute corresponding to the text information comprises:
   acquiring a topic type corresponding to the text information; and
   determining the subjective evaluation being less than a preset evaluation value, if the topic type corresponding to the text information is consistent with the topic type corresponding to the user intent.

5. The method according to claim 3, wherein, if the content attribute is the emotional attribute, the obtaining the subjective evaluation based on the content attribute corresponding to the text information comprises:
   extracting an emotional keyword in the text information;
   acquiring an emotional type according to a corresponding relationship between the emotional keyword and the emotional type, wherein the emotional type includes a positive emotion, a negative emotion, and a neutral emotion; and
   acquiring the subjective evaluation according to a corresponding relationship between the emotional type and a preset evaluation.

6. The method according to claim 1, wherein the acquiring a speech interaction feature comprises:
   acquiring first log data, wherein an interval between the first log data and second log data in a last period adjacent to the first log data, and the interval between the first log data and third log data in a next period adjacent to the first log data are greater than a preset threshold;
   acquiring, in the first log data, topics respectively corresponding to two adjacent voice inputs of the user; and
   acquiring the speech interaction feature based on the topics respectively corresponding to the two adjacent voice inputs.

7. The method according to claim 1, wherein before the obtaining a speech interaction satisfaction outputted by a satisfaction evaluation model by using the objective evaluation and the subjective evaluation as an input of the satisfaction evaluation model, the method further comprises:
   acquiring a training sample set, wherein the training sample set includes a first sample evaluation, a second sample evaluation, and a satisfaction inputted by the user, the first sample evaluation is obtained by evaluating objective sample data, the second sample evaluation is obtained by evaluating subjective sample data, and the objective sample data and the subjective sample data are data for an identical topic; and
   obtaining the satisfaction evaluation model by performing iterative training on the basis of the training sample set.

8. An apparatus for determining a speech interaction satisfaction, comprising:
   at least one processor; and
   a memory storing instructions, the instructions when executed by the at least one processor, cause the at least one processor to perform operations, the operations comprising:
   acquiring a speech interaction feature, the speech interaction feature including objective data of speech interaction and subjective data of the speech interaction, and the objective data and the subjective data being data for a given topic, wherein the objective data of the speech interaction includes a user intent, response content, a response delay, and a current playback duration of the response content; and the subjective data of the speech interaction includes: text information corresponding to a voice input of a user after playback of the response content is interrupted, or text information inputted by the user after the playback of the response content is completed;
   evaluating the objective data to obtain an objective evaluation, and evaluating the subjective data to obtain a subjective evaluation; and
   obtaining a speech interaction satisfaction outputted by a satisfaction evaluation model by using the objective evaluation and the subjective evaluation as an input of the satisfaction evaluation model.

9. The apparatus according to claim 8, wherein the evaluating the objective data to obtain an objective evaluation comprises:
   acquiring a first objective evaluation based on an intent matching degree between the user intent and the response content;
   acquiring a second objective evaluation based on the response delay and a standard delay; and
   acquiring a third objective evaluation based on the current playback duration of the response content and a standard playback duration of the response content; and
   the obtaining a speech interaction satisfaction outputted by a satisfaction evaluation model by using the objective evaluation and the subjective evaluation as an input of the satisfaction evaluation model comprises:
   obtaining the speech interaction satisfaction outputted by the satisfaction evaluation model by using the first objective evaluation, the second objective evaluation, the third objective evaluation, and the subjective evaluation as the input of the satisfaction evaluation model.

10. The apparatus according to claim 8, wherein the evaluating the subjective data to obtain a subjective evaluation comprises:
   performing a semantic analysis on the text information, to obtain a content attribute corresponding to the text information, wherein the content attribute is an emotional attribute or a topic attribute; and
   obtaining the subjective evaluation based on the content attribute corresponding to the text information.

11. The apparatus according to claim 10, wherein, if the content attribute is the topic attribute, the obtaining the subjective evaluation based on the content attribute corresponding to the text information comprises:
   acquiring a topic type corresponding to the text information; and
   determining the subjective evaluation being less than a preset evaluation value, if the topic type corresponding to the text information is consistent with the topic type corresponding to the user intent.

12. The apparatus according to claim 10, wherein, if the content attribute is the emotional attribute, the obtaining the subjective evaluation based on the content attribute corresponding to the text information comprises:
   extracting an emotional keyword in the text information;
   acquiring an emotional type according to a corresponding relationship between the emotional keyword and the emotional type, wherein the emotional type includes a positive emotion, a negative emotion, and a neutral emotion; and
   acquiring the subjective evaluation according to a corresponding relationship between the emotional type and a preset evaluation.

13. The apparatus according to claim 8, wherein the acquiring a speech interaction feature comprises:
   acquiring first log data, wherein an interval between the first log data and second log data in a last period adjacent to the first log data, and the interval between the first log data and third log data in a next period adjacent to the first log data are greater than a preset threshold;
   acquiring, in the first log data, topics respectively corresponding to two adjacent voice inputs of the user; and
   acquiring the speech interaction feature based on the topics respectively corresponding to the two adjacent voice inputs.

14. The apparatus according to claim 8, before the obtaining a speech interaction satisfaction outputted by a satisfaction evaluation model by using the objective evaluation and the subjective evaluation as an input of the satisfaction evaluation model, the operations further comprise:
   acquiring a training sample set, wherein the training sample set includes a first sample evaluation, a second sample evaluation, and a satisfaction inputted by the user, the first sample evaluation is obtained by evaluating objective sample data, the second sample evaluation is obtained by evaluating subjective sample data, and the objective sample data and the subjective sample data are data for an identical topic; and
   obtaining the satisfaction evaluation model by performing iterative training on the basis of the training sample set.

15. A non-transitory computer-readable storage medium storing a computer program, the computer program when executed by one or more processors, causes the one or more processors to perform operations, the operations comprising:
   acquiring a speech interaction feature, the speech interaction feature including objective data of speech interaction and subjective data of the speech interaction, and the objective data and the subjective data being data for a given topic, wherein the objective data of the speech interaction includes a user intent, response content, a response delay, and a current playback duration of the response content; and the subjective data of the speech interaction includes: text information corresponding to a voice input of a user after playback of the response content is interrupted, or text information inputted by the user after the playback of the response content is completed;

evaluating the objective data to obtain an objective evaluation, and evaluating the subjective data to obtain a subjective evaluation; and obtaining a speech interaction satisfaction outputted by a satisfaction evaluation model by using the objective evaluation and the subjective evaluation as an input of the satisfaction evaluation model.

\* \* \* \* \*